United States Patent
Ito et al.

[11] Patent Number: 5,494,732
[45] Date of Patent: *Feb. 27, 1996

[54] MAGNETIC RECORDING MEDIUM AND A METHOD FOR PRODUCING THE SAME WHEREIN THE MEDIUM HAS TWO MAGNETIC LAYERS DIFFERING IN DEGREE OF ORIENTATION

[75] Inventors: Takeo Ito, Yokohama; Hirotaka Yokoyama, Yokosuka, both of Japan

[73] Assignee: Kabushiki Kaisha Toshiba, Kawasaki, Japan

[ * ] Notice: The term of this patent shall not extend beyond the expiration date of Pat. No. 5,384,182.

[21] Appl. No.: 320,657

[22] Filed: Oct. 11, 1994

Related U.S. Application Data

[63] Continuation-in-part of Ser. No. 781,213, Jan. 6, 1992, Pat. No. 5,384,182.

[51] Int. Cl.$^6$ .................................................. G11B 5/00
[52] U.S. Cl. .................... 428/212; 428/216; 428/329; 428/336; 428/402; 428/694 BA; 428/694 BH; 428/694 BM; 428/900; 427/128; 427/131; 427/548
[58] Field of Search .................... 428/212, 216, 428/329, 336, 402, 694 BH, 694 BA, 694 BM, 900; 427/128, 131, 548

[56] References Cited

U.S. PATENT DOCUMENTS

| | | | |
|---|---|---|---|
| 3,023,166 | 2/1962 | Duinker et al. | 428/694 |
| 4,624,883 | 11/1986 | Yamaguchi et al. | 428/212 |
| 4,624,894 | 11/1986 | Kishimoto et al. | 428/328 |
| 4,643,941 | 2/1987 | Miyoshi et al. | 428/323 |
| 4,746,569 | 5/1988 | Takahashi et al. | 428/323 |
| 4,784,895 | 11/1988 | Mizuno et al. | 428/212 |
| 5,114,801 | 5/1992 | Aoki et al. | 428/694 |
| 5,156,908 | 10/1992 | Araki et al. | 428/323 |
| 5,384,182 | 1/1995 | Ito | 428/212 |

FOREIGN PATENT DOCUMENTS

| | | |
|---|---|---|
| 1114245 | 12/1981 | Canada. |
| 60-157724 | 8/1985 | Japan. |
| 1562601 | 3/1980 | United Kingdom. |

*Primary Examiner*—Stevan A. Resan
*Attorney, Agent, or Firm*—Cushman Darby & Cushman

[57] ABSTRACT

A magnetic recording medium having a nonmagnetic supporting member and a plurality of magnetic layers formed on at least one major surface of the nonmagnetic supporting member, comprising a first longitudinally oriented magnetic layer having a first longitudinally orientation rate located uppermost and comprising a hexagonal system ferromagnetic powder, and a second longitudinally oriented magnetic layer having a second longitudinally orientation rate located between the nonmagnetic supporting member and the first longitudinally oriented magnetic layer and comprising a needle-like crystal magnetic powder, wherein the first longitudinally orientation rate of the first longitudinally oriented magnetic layer is at least 0.5 and is smaller than the second longitudinally orientation rate of the second longitudinally oriented magnetic layer.

10 Claims, 1 Drawing Sheet

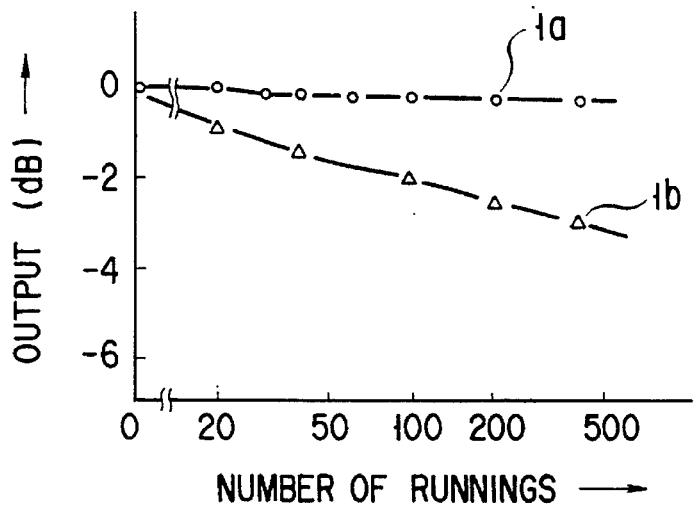
F I G. 1
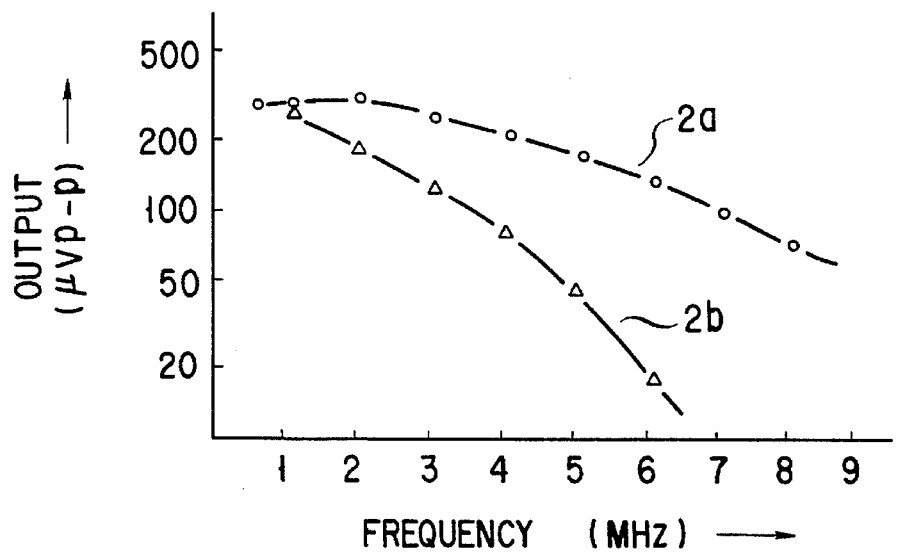
F I G. 2
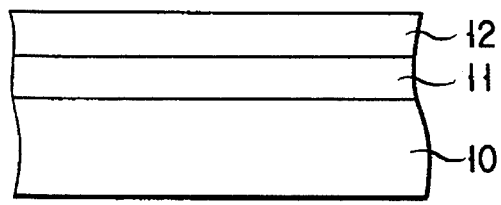
F I G. 3

MAGNETIC RECORDING MEDIUM AND A METHOD FOR PRODUCING THE SAME WHEREIN THE MEDIUM HAS TWO MAGNETIC LAYERS DIFFERING IN DEGREE OF ORIENTATION

CROSS-REFERENCE TO THE RELATED APPLICATIONS

This application is a continuation-in-part of U.S. patent application Ser. No. 07/781,213 filed on Jan. 6, 1992, now U.S. Pat. No. 5,384,182.

BACKGROUND OF THE INVENTION

1. Field of the Invention

This invention relates to a magnetic recording medium and a method for producing the same through which high reproducibility can be obtained in a wide range from a short wavelength region to a long wavelength region and on which recording of high density can be applied.

2. Description of the Related Art

Recently, magnetic recording mediums have been extensively used as a recording medium for recording a large amount of information in various applications such as audio, video, computer, and the like. The recording density of the media are accordingly expected to be improved.

Under this expectation, vertical magnetic recording is drawing attention, which makes hexagonal ferromagnetic powder such as ferrite powder in ultra fine particles whose magnetization easy axis is vertical to a plane of the ferrite particle to orient such that the particle plane is horizontal to a surface of a magnetic layer, and thereby utilizes remnant magnetization vertical to a surface of the magnetic recording medium.

These magnetic recording media having the hexagonal ferromagnetic powder mounted highly reproduce signals in a short wavelength region less than 1 micron. Whereas, it has been revealed that high reproducibility cannot be obtained in a long wavelength region.

Therefore, there is same problem that sufficient recording and reproducing cannot be obtained when the media are applied to VTR tapes for recording audio signals and color signals in a long wavelength region.

In order to solve this problem, a trial was conducted to form a double-layered structure having a lower layer consisting of Co-γ ferrite powder of low coercive force and an upper layer consisting of another Co-γ ferrite powder of high coercive force, and applying the upper layer to video use and the lower one to audio use. However, this trial suffers from the fact that the upper layer is likely to demagnetize under pressure, so as to reduce the high-frequency characteristics.

On the other hand, a double-layered magnetic recording medium comprising a first magnetic layer as a lower layer formed of needle-like crystal ferromagnetic powder such as metal magnetic powder and oxide magnetic powder which are advantageous for signals having a long wavelength to record and reproduce the signals, and a vertical oriented second magnetic layer as an upper layer formed of hexagonal ferromagnetic powder in which the vertical segment of remanent magnetization is more effective for signals in a short wavelength region.

However, this two-layered magnetic recording medium suffers from many problems.

For example, the optimal current magnitude of a recording/reproduced signal for the first magnetic layer mainly consisting of the needle-like crystal ferromagnetic powder and that of the second magnetic layer consisting of the vertically-oriented hexagonal ferromagnetic powder are largely different, and high reproducing cannot be obtained for a wide range from a short wavelength region to a long wavelength region.

Moreover, since the double-layered structure of this magnetic recording medium has different magnetizing orientations between in the first magnetic layer mainly consisting of longitudinally oriented needle-like crystal ferromagnetic powder and the second magnetic layer consisting of vertically-oriented hexagonal ferromagnetic powder, a simultaneous magnetic orientation and coating of both layers is very difficult. Therefore, step-by-step coating is required for separating the two-magnetic recording layer which comprises a step of making needle-like crystal magnetic powder film to be longitudinally-oriented in the surface direction to form a lower layer and a step of forming a vertically-orientated film to form an upper layer.

This step-by-step coating, however, is not likely to provide a two-layered magnetic recording medium with good surface characteristics, because the surface characteristics of the lower layer easily affect those of the upper layer. Therefore, desired characteristics cannot be obtained and a deterioration of the S/N ratio will occur.

An object of the invention is to overcome the above-mentioned problems, by providing magnetic recording media which highly reproduce signals in a wide range from a short wavelength region to a long wavelength region and also which have excellent durability and reliability.

Another object of the invention is to provide a method for producing magnetic recording media formed of multi-layers with a high reproducibility and showing good surface characteristics and excellent electromagnetic characteristics such as S/N ratio.

SUMMARY OF THE INVENTION

A magnetic recording medium according to the invention has a first longitudinally-oriented magnetic layer formed of needle-like crystal ferromagnetic powder and a binder ingredient coated on a base support, and a second longitudinally-oriented magnetic layer formed of hexagonal ferromagnetic powder and a binder ingredient coated on the first longitudinally-oriented magnetic layer, the longitudinal orientation rate of the second layer is set to be smaller than that of the first layer.

A method of producing a magnetic recording medium according to the invention is for a magnetic recording medium having a first longitudinally-oriented magnetic layer formed of a needle-like crystal ferromagnetic powder and a binder ingredient coated and a second longitudinally-oriented magnetic layer formed of a hexagonal system ferromagnetic powder and a binder ingredient coated on the first magnetic layer, and comprises a step of applying to a base support a first magnetic coating which contains needle-like crystal magnetic powder dispersed in a binder ingredient and a second magnetic coating which contains hexagonal ferromagnetic powder in a binder ingredient, a step of making longitudinal orientation in the first magnetic coating and the second magnetic coating, and a step of drying the first and the second magnetic coatings to obtain the first and the second longitudinally-oriented magnetic layers.

A feature of the invention is to provide a two-layered structure of a first magnetic layer of needle-like crystal ferromagnetic powder and a second magnetic layer of hexagonal system ferromagnetic powder. By means of this structure, high reproducibility can be obtained for signals in a wide frequency range from a long wavelength region to a short wavelength region.

Another feature of the invention is to provide a longitudinal orientation both in the first magnetic layer and the second magnetic layer, such that the longitudinal orientation rate in the second magnetic layer is smaller than that of the first magnetic layer.

Since the second magnetic layer is formed of longitudinally-oriented hexagonal ferromagnetic powder, the optimal current value of the first magnetic layer mainly formed of needle-like crystal ferromagnetic powder can be made to approximated to that of the second magnetic layer. Therefore, excellent reproducibility can be obtained in a wide frequency range from a short wavelength region to a long wavelength region, which cannot be obtained by a conventional combination of a longitudinally-oriented magnetic layer and a vertically-oriented magnetic layer.

Also, according to the method of the invention, the first magnetic coating which contains capillary crystal ferromagnetic powder dispersed in a binder ingredient and the second magnetic coating which contains hexagonal system ferromagnetic powder dispersed in a binder ingredient are simultaneously longitudinally-oriented under the condition thus both coatings are not dried.

The needle-like crystal ferromagnetic powder is likely to be longitudinally-oriented for its structure, while the hexagonal system ferromagnetic powder is likely to be vertically oriented. Therefore, if the same linear orientation is performed on both powders, the orientation rate of the second longitudinally-oriented magnetic layer is made to be smaller than that of the first longitudinally-oriented magnetic layer.

According to the present invention, a multi-layered magnetic recording medium of different longitudinal orientation rates can be produced at high productivity comparable to the conventional method for a single-layer coating. Further, according to the method of the invention, interfacial disturbance between the layers can be reduced, resulting in good surface characteristics and an excellent S/N ratio.

According to the magnetic recording medium of the present invention, the longitudinal orientation rate of the first magnetic layer is preferably at least 0.7. Reproducibility can be improved for signals in a long wavelength region thereby.

Also, the longitudinal orientation rate of the second magnetic layer is at least 0.5, preferably at least 0.55. By this longitudinal orientation rate, the difference in optimal current values between the first layer and the second layer can be made small, resulting in high reproducibility in a wide frequency range. However, the longitudinal orientation rate of the second magnetic layer is not preferably too high to affect the short wavelength characteristics. Specifically, the longitudinal orientation rate of the second layer is required to be selected within that of the first magnetic layer, i.e., 0.8 or less.

According to the longitudinal orientation magnetic layer of the invention, the longitudinally-oriented magnetic layer is defined as a layer having a longitudinal orientation rate of at least 0.5 in the longitudinal direction.

The longitudinal orientation rate of the first magnetic layer is obtained by measuring the longitudinal orientation rate in the longitudinal direction when only the first magnetic layer is formed on the base support and that of the second longitudinally-oriented magnetic layer is obtained under the condition in which the second layer is formed on the first layer and by measuring the longitudinal orientation rate in the longitudinal direction with the first magnetic layer only. The orientation rate of the second longitudinal orientation magnetic layer in the longitudinal direction with the second layer only is calculated by adding the orientation rates in the longitudinal direction with both of the first and the second longitudinally-oriented magnetic layers, and then subtracting from the resultant rate that of the first layer only.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows the durability of the magnetic recording media, taking an ordinate for reproducibility, and an abscissa for the number of runnings;

FIG. 2 shows the frequency-dependency of reproducibility, taking the ordinate for the reproducibility and the abscissa for frequency; and FIG. 3 shows an example of a magnetic recording medium according to the invention.

DETAILED DESCRIPTION OF THE PREFERRED EMBODIMENTS

Embodiments of the invention are described as follows.

Before describing concrete examples, a structure of a magnetic recording medium according to the invention is generally described.

According to a magnetic recording medium of the invention, examples of needle-like ferromagnetic powder to be used for a first magnetic recording layer include oxide ferromagnetic powder such as $\gamma\text{-}Fe_2O_3$, $Co\text{-}\gamma\text{-}Fe_2O_3$, $Co\text{-}\gamma\text{-}Fe_3O_4$, $CrO_2$ and metal ferromagnetic powder such as Fe and Co-Fe alloy, both powders have a needle-like crystal structure. The particle diameter of these needle-like crystal ferromagnetic powder is generally shown in longitudinal axis, and 0.1–1 micron is preferable.

Examples of hexagonal ferromagnetic powder to be used for a second magnetic recording layer include Ba ferrites of M-type and W-type, Sr ferrite, Ca ferrite, Pb ferrite, a solid solution of these ferrites, and ion substituents shown in the following general formula: $AO \cdot n(Fe_{1-m}M_m)_2O_3$ (A is selected from a group consisting of Ba, St, Ca, and Pb, M is at least one selected from a group consisting of Zn, Co, Ti, Ni, Mn, In, Cu, Ge, Nb, Sn, Zr, Hf, and Al, m is the number of 0–2, and n is the number of 5.4–12. When M is a divalent or at least quadrivalent element, M is a combination of at least two elements whose mean valence is 3). These ferrites are in the form of ultrafine particle powder, shows uniaxial anisotropy having the easy axis of magnetization vertical to the particle surface, exhibits a 200 Oe-2000 Oe coercive force, and is magnetized to form the second layer.

For signals in a short wavelength region to reproduce, such a hexagonal system ferromagnetic powder is preferably used as having hexagonal plate crystal and a 0.03 to 0.1 micron particle diameter when taking the length of the plate diagonal line for the particle diameter.

The ratio of the length of the diagonal line and the thickness of the hexagonal plate (hereinafter abbreviated as the plate ratio) is preferably 2 to 7. By taking this plate ratio within a given range, the longitudinal orientation rate in each magnetic layer can be desirably made different. This difference enables magnetization characteristics in the vertical direction inherent to the hexagonal ferromagnetic powder to express, resulting in an excellent reproducibility for signals in a short wavelength region.

A magnetic recording medium according to the invention is generally produced as follows.

For a first magnetic layer to form, needle-like crystal ferromagnetic powder and binder are dispersed or dissolved in a solvent, and sufficiently kneaded by means of a kneader a bowl mill or a sand mill to prepare a magnetic coating. To this magnetic coating, various additives are added such as dispersing agents, lubricants, antistatic agents examples of which include graphite powder and carbon black as desired.

The binder to be used for the magnetic coating as said above may be known agents conventionally utilized. Examples of these binders include, polyurethane resin, polyester resin, polycarbonate resin, polyacryl resin, epoxy resin, phenol resin, vinyl chloride resin, vinyl acetate resin, and mixtures and copolymers of these resins. Examples of the lubricant include lauric acid, palmitic acid, and stearic acid. Examples of the dispersing agent include lecithin and various kinds of surfactants.

When the first magnetic layer is formed by utilizing the magnetic coating thus obtained, the longitudinal orientation rate is preferably made at least 0.7, and the thickness of the layer is also preferably made more or less 1 to 5 microns. By making the thickness of the first magnetic layer 1 to 5 microns, good surface characteristics can be ensured after calendering.

For a second magnetic layer to form, according to the same manner as that for the first magnetic layer, firstly, a hexagonal system ferromagnetic powder is uniformly dispersed in a various kinds of binders to prepare a magnetic coating. To this magnetic coating for the second magnetic layer, an abrasive is added, namely, inorganic powder is added in an amount of 0.5 to 10 weight parts in relation to 100 weight parts of the magnetic powder. Examples of the inorganic powder include $TiO_2$, $Cr_2O_3$, $Al_2O_3$, SiC, and $ZrO_2$, which are at least 5 in Moh's hardness and 0.1 to 2.0 microns in a mean diameter.

After that, a first layer and a second layer are simultaneously formed on a nonmagnetic base support at the constant rate by utilizing a die for forming a two-layered film equipped with slits for separately extruding the first and the second magnetic coatings prepared as above, such that the extrusion rate is controlled to obtain a desired thickness of each of the first and the second layer. The double-layered film thus obtained is longitudinally-oriented under a 1 to 4K Gauss magnetic field before the film is dried by utilizing a solenoid-type or an opposed magnetic-pole type longitudinal orientation magnetic field, and the surface of the second layer is then smoothed by calendering after the film is dried. By this smoothing, the abrasive included in the second magnetic layer is made to cut into the first magnetic layer, successfully maintained in the binder content and the second layer is inhibited to remove from the first layer.

The thickness of the second magnetic layer is preferably more or less 0.1 to 0.5 micron in order to ensure recording characteristics for signals in a short wavelength region and still not to deteriorate recording characteristics for signals in a long wavelength region. The longitudinal orientation rate of the second magnetic layer is preferably at least 0.5, and more preferably at least 0.55, so that the optimal current value of the first magnetic layer will match that for the second magnetic layer and compatibility with a longitudinal orientation of the first layer formed of needle-like crystal powder should be ensured. However, the orientation rate is required to be restricted within a range of that of the first magnetic layer, because too high orientation rate affects the short wavelength recording characteristics.

Into the second magnetic layer, a trace quantity of antistatic agent may be added, but need not be added, because the second layer is not changed with a little conductive powder added when the first magnetic layer is sufficiently conductive. In order to improve recording and reproducing characteristics, it is recommended that the ratio of the magnetic powder included in the second magnetic layer is increased, rather than addition of the antistatic agent.

The conductivity of the first magnetic layer may be secured by adding a conductivity-imparting agent, such as carbon black, to the first magnetic layer, but no conductivity function may be imparted only to the first magnetic layer.

That is, use may be made of a nonmagnetic, conductive base support or the conductivity of the magnetic recording medium may be secured by, while simultaneously forming first and second magnetic layers, coating a conductive paint containing the conductivity-imparting agent such as carbon black, as a conductive layer, between the base support and the magnetic first/second layer structure.

With the magnetic recording medium of the present invention, in addition to the first and second magnetic layers as set out above, an intermediate layer may also be provided between the first magnetic layer and the second magnetic layer so as to prevent any disturbance, etc., at a boundary surface between the first magnetic layer and the second magnetic layer. The intermediate layer may contain a binder, as a principal constituent, with or without magnetic powder, lubricant, carbon black, etc.

(Example 1)

| [Coating Ingredients for the First Magnetic Layer] | |
|---|---|
| Co coated γ-ferrite Powder (mean particle diameter: 0.3 micron, coercive force: 520 Oe) | 100 w.p. |
| Carbon Black | 4 w.p. |
| Lethicin | 3 w.p. |
| Polyurethane Resin (manufactured by Toyobo K.K.) | 12 w.p. |
| Copolymer Resin of vinyl chloride/vinyl acetate (manufactured by Union Carbide Corp.) | 6 w.p. |
| Methylethylketon | 80 w.p. |
| Cyclohexanon | 80 w.p. |
| Toluene | 80 w.p. |
| [Coating Ingredients for the Second Magnetic Layer] | |
| Ba-ferrite Powder (coercive force: 950 Oe, mean particle diameter: 0.05 micron, the plate ratio: 3) | 100 w.p. |
| $Al_2O_3$ Powder (mean particle diameter: 0.5 micron) | 4 w.p. |
| Lethicin | 3 w.p. |
| Stearic Acid | 2 w.p. |
| Polyurethane Resin (manufactured by | 8 w.p. |

|  |  |
|---|---|
| Toyobo K.K.) | |
| Copolymer Resin of vinyl chloride/vinyl acetate (manufactured by Union Carbide Corp.) | 8 w.p. |
| Methylethylketone | 80 w.p. |
| Cyclohexanon | 80 w.p. |
| Toluene | 80 w.p. |

First, the coating ingredients for the first magnetic layer as said were sufficiently kneaded, and further made to disperse for one hour by utilizing a sand grinder to prepare a magnetic coating for the first magnetic layer.

Also, the coating ingredients for the second magnetic layer were sufficiently mixed, and further made to disperse for two hours by utilizing a sand grinder to prepare a magnetic coating for the second magnetic layer.

To each of the magnetic coating for the magnetic layers, an isocianate compound of three weight parts was added as a curing agent, followed by stirring. Next, a die for a double-layered film was adjusted to obtain a first layer of a 3-micron thickness and a second layer of a 0.3-micron thickness after drying. The magnetic coating paints were then simultaneously extruded through the die to a polyester film of 10-micron thickness, longitudinally-oriented in the magnetic field of 2K Gauss excited by utilizing an opposed magnetic pole, and dried. After that, the surface of the obtained film was smoothed by calendering to form a two-layered magnetic recording medium.

The magnetic recording medium thus obtained is shown in FIG. 3. In the FIG. 3, a part of a magnetic tape is shown which has a structure obtained by coating a first magnetic layer 11 and a second magnetic layer 12 on a base support 10 in this order.

The longitudinal orientation rate of the first magnetic layer only is 0.84, and that of the second magnetic layer only is 0.60.

(Example 2)

A magnetic recording medium was formed by utilizing the same coating composition as that for the example 1 according to the same manner as that of the example 1, with the exception that the thickness of the first layer was made to be 3 microns, and that of the second layer was made to be 0.7 micron after drying.

The linear orientation rate of the first magnetic layer only was 0.84, and that of the second magnetic layer only was 0.61.

(Example 3)

A magnetic recording medium was formed by utilizing the same coating composition as that of the example 1 according to the same manner as that of the example 1, with the exception that the thickness of the first layer was made to be 3 microns, and that of the second magnetic layer was made to be 1.0 micron.

The longitudinal orientation rate of the first magnetic layer only was 0.83, and that of the second magnetic layer only was 0.60.

(Example 4)

A magnetic recording medium was formed by utilizing the same coating composition as that for the example 1 according to the same manner as that for the example 1, with the exception that longitudinal orientation was made in a magnetic field of 1K Gauss excited by means of an opposed magnetic pole.

The longitudinal orientation rate of the first magnetic layer only was 0.68, and that of the second magnetic layer only was 0.57.

(Example 5)

| [Coating Ingredients for the First Magnetic Layer] | |
|---|---|
| $\gamma$-$Fe_2O_3$ powder (mean particle diameter: 0.35 micron, coercive force: 480 Oe) | 100 w.p. |
| Carbon Black | 4 w.p. |
| Phosphoric ester | 2 w.p. |
| Polyurethane Resin (manufactured by Toyobo K.K.) | 6 w.p. |
| Copolymer Resin of Polyvinyl Chloride Containing Sulphon Group (manufactured by Nihon Zeon K.K.) | 6 w.p. |
| Methylethylketone | 65 w.p. |
| Cyclohexanon | 65 w.p. |
| Toluene | 65 w.p. |
| [Coating Ingredients for the Second Magnetic Layer] | |
| Ba-ferrite Powder (mean particle diameter: 0.035 micron, coercive force: 1400 Oe, the plate ratio: 3.2) | 100 w.p. |
| $Al_2O_3$ powder (mean particle diameter: 0.5 micron) | 6 w.p. |
| Octylmyristirate | 1 w.p. |
| Stearic Acid | 2 w.p. |
| Butylstearate | 1 w.p. |
| Polyester Resin Containing Sulphone Group (manufactured by Toyobo K.K.) | 8 w.p. |
| Copolymer Resin of Polyvinyl Chloride Containing Sulphon Group (manufactured by Nihon Zeon K.K.) | 8 w.p. |
| Methylethylketone | 80 w.p. |
| Cyclohexanon | 60 w.p. |
| Toluene | 80 w.p. |

First, the coating ingredients for a first magnetic layer was sufficiently kneaded, and further dispersed for additional one hour by utilizing a sand grinder to prepare a magnetic coating for a first magnetic layer.

Next, the coating ingredients for a second magnetic layer was sufficiently kneaded, further dispersed for two additional hours by utilizing a sand grinder to prepare a magnetic coating for a second magnetic layer.

To each of the magnetic coating for the magnetic layers, an isocianate compound of three weight parts was added as a curing agent, followed by kneading. Next, a die for a double-layered film was adjusted to obtain a first layer of a 3-micron thickness and a second layer of a 0.4-micron thickness after drying. The magnetic coatings thus prepared were then simultaneously extruded through the die to a polyester film of a 10-micron thickness, longitudinally-oriented in the magnetic field of 2K Gauss excited by utilizing opposed magnetic poles, and dried. After that, the surface of the obtained film was smoothed by calendering to form a double-layered magnetic recording medium.

The longitudinal orientation rate of the first magnetic layer only was 0.84, and that of the second magnetic layer only was 0.67.

(Example 6)

A magnetic recording medium was formed by utilizing the same coating composition as that of the example 5, with the exception that $\gamma$-$Fe_3O_4$ powder having a 0.26 mean particle diameter and a 660 Oe coercive force was utilized in place of the magnetic powder in the magnetic coating ingredients for the first magnetic layer.

The longitudinal orientation rate of the first magnetic layer only was 0.82, and that of the second magnetic layer only was 0.66.

(Example 7)

A magnetic recording medium was formed by utilizing the same coating composition as that of the example 5, with the exception that $CrO_2$ powder having a 0.32 micron mean particle diameter and 700 Oe coercive force was used in place of the magnetic powder in the magnetic coating ingredients for the first magnetic layer.

The longitudinal orientation rate of the first magnetic layer only was 0.88, and that of the second magnetic layer only was 0.65.

(Example 8)

A magnetic recording medium was formed by utilizing the same coating composition as that of the example 5, with the exception that $Co-\gamma-Fe_2O_3$ powder having a 0.2 micron mean particle diameter and 700 Oe coercive force was utilized in place of the magnetic powder in the magnetic coating ingredients for the first magnetic layer, that Ba-ferrite powder having a 0.04 micron means particle diameter, 1200 Oe coercive force and a 3.5 plate ratio was utilized in place of the magnetic powder in the magnetic coating ingredients for the second magnetic layer, and that longitudinal orientation was made in a magnetic field of 3K Gauss excited by solenoid type electromagnet.

The longitudinal orientation rate of the first magnetic layer only was 0.90, and that of the second magnetic layer only was 0.70.

(Example 9)

A magnetic recording medium was formed by utilizing the same coating composition as that of the example 8, with the exception that longitudinal orientation was made in a magnetic field of 4K Gauss excited by solenoid type electromagnet.

The longitudinal orientation rate of the first magnetic layer only was 0.92, and that of the second magnetic layer only was 0.72.

(Example 10)

A magnetic recording medium was formed by utilizing the same coating composition as that of the example 8, with the exception that longitudinal orientation was made in a magnetic field of 5K Gauss excited by solenoid type electromagnet.

The longitudinal orientation rate of the first magnetic layer only was 0.94, and that of the second magnetic layer only was 0.74.

(Example 11)

A magnetic recording medium was formed by utilizing the same coating composition as that of the example 8, with the exception that Ba-ferrite powder having a 0.05 micron means particle diameter, 1250 Oe coercive force and a 4.0 plate ratio was utilized in place of the magnetic powder in the magnetic coating ingredients for the second magnetic layer.

The longitudinal orientation rate of the first magnetic layer only was 0.90, and that of the second magnetic layer only was 0.78.

(Example 12)

A magnetic recording medium was formed by utilizing the same coating composition as that of the example 8, with the exception that Ba-ferrite powder having a 0.05 micron means particle diameter, 1300 Oe coercive force and a 4.5 plate ratio was utilized in place of the magnetic powder in the magnetic coating ingredients for the second magnetic layer.

The longitudinal orientation rate of the first magnetic layer only was 0.92, and that of the second magnetic layer only was 0.80.

(Comparative Example 1)

The second magnetic coating of the example 1 was coated to a polyester film of a 10-micron thickness by utilizing a die coater such that the thickness of the layer after drying is 3 microns, and longitudinally-oriented in a 2K Gauss magnetic field excited by means of opposed magnetic poles, followed by drying. After that, the surface of the coated film was smoothed by calendering to form a single-layered magnetic recording medium.

The longitudinal orientation rate of this magnetic layer was 0.68.

(Comparative Example 2)

A magnetic recording medium was formed in the same manner as that for the example 1 by utilizing the same composition as that for the first magnetic layer in the example 1 to form a second magnetic layer with the exception that the magnetic powder was replaced with $Co-\gamma$ ferrite powder having a mean particle diameter of 0.18 micron and coercive force of 780 Oe.

The linear orientation rate of the first magnetic layer of this magnetic recording medium was 0.84, and that of the second magnetic layer was 0.79.

(Comparative Example 3)

To the magnetic coating for the first magnetic layer of the example 1, an isocianate compound of three weight parts was added as a curing agent, followed by stirring. The resultant coating was coated on a base support such that the thickness of the coated layer is 3 micron, and subjected to a randomizer, followed by drying. The surface of the coated layer was then smoothed by calendering to form a first magnetic layer.

Next, by utilizing the same magnetic coating composition as that for the second magnetic layer of the example 1, with the exception that Ba-ferrite powder was used which has a 980 Oe coercive force, a 0.06-micron mean particle diameter, and a 4.8 plate ratio, that a second magnetic layer was further coated such that the thickness of the second layer was 0.3 micron after drying. After that, the resultant coated second layer was subjected to a linear magnetic field of solenoid-type, followed by drying. The surface of the second layer was then smoothed by calendering to form a second magnetic layer.

The longitudinal orientation rate of the first magnetic layer of this magnetic recording medium was 0.61, and that of the second magnetic layer was 0.77.

(Comparative Example 4)

To the magnetic coating for the first magnetic layer of the example 1, an isocianate compound of three weight parts was added as a curing agent, followed by stirring. The obtained coating was coated on a base support such that the thickness of the coated layer was 3 microns, and subjected to a randomizer, followed by drying. The surface of the coated layer was then smoothed by calendering to form a first magnetic layer.

Next, to the magnetic coating for the second magnetic layer of the example 1, an isocianate compound of three weight parts was added as a curing agent, followed by stirring. The resultant coating was coated to the first magnetic layer such that the thickness of the second layer was 0.3 micron, and subjected to a vertical orientation magnetic field followed by drying. The surface of the coated second layer was then smoothed by calendering to form a second magnetic layer.

The longitudinal orientation rate of the first magnetic layer of this magnetic recording medium was 0.61, and that of the second magnetic layer was 0.40.

The magnetic recording media of the example 1 and the comparative example 1 were cut into tapes of a ½ inch width to obtain magnetic tapes. Reproducibility of these magnetic tapes at each (low and high) frequency region was measured by means of a drum tester. The results are shown in FIGS. 1 and 2.

FIG. 1 shows running durability, namely, the relation between the number of runnings and reproducibility (dB). The curve 1a in FIG. 1 shows the result for the example 1, and the curve 1b shows the result for the comparative example 2. FIG. 2 shows the reproducibility (micro volts Vp-p) at each wavelength region (micron). The curve 2a shows the result for the embodiment, and the curve 2b shows the result for the comparative example.

As apparent from FIG. 1, the magnetic recording medium for the example 1 according to the invention was not found to be demagnetized under pressure due to repeated runnings, by which high density recording characteristics can be maintained. Further, as apparent from FIG. 2, the magnetic recording medium of the example 1 exhibits excellent reproducibility in a wider wavelength range from a short wavelength region to a long wavelength region in comparison with that obtained from the magnetic recording medium of the comparative example 2.

Also, the magnetic recording medium of each example and each comparative example as said was cut into tapes of a 8 mm width. Characteristics of the tape for each example are shown in Table 1.

TABLE 1

|  | Lower layer orientation rate | Upper layer orientation rate | Surface coarseness Rz: mm | 7 MHz output (dB) | Y-S/N (dB) | Color output (dB) | C-S/N (dB) |
| --- | --- | --- | --- | --- | --- | --- | --- |
| Example 1 | 0.84 | 0.60 | 0.022 | −0.2 | 0 | +3.0 | +2.0 |
| Example 2 | 0.84 | 0.61 | 0.020 | 0 | −0.1 | +2.2 | +1.2 |
| Example 3 | 0.83 | 0.60 | 0.018 | +0.1 | +1.2 | +1.4 | +0.6 |
| Example 4 | 0.68 | 0.57 | 0.015 | 0 | 0 | +1.3 | +0.5 |
| Example 5 | 0.84 | 0.67 | 0.024 | +0.1 | +0.2 | +3.4 | +1.6 |
| Example 6 | 0.82 | 0.66 | 0.024 | −0.2 | +0.1 | +2.8 | +2.1 |
| Example 7 | 0.88 | 0.65 | 0.020 | −0.1 | −0.2 | +3.1 | +2.1 |
| Example 8 | 0.90 | 0.70 | 0.020 | +0.1 | +0.5 | +3.2 | +2.2 |
| Example 9 | 0.92 | 0.72 | 0.019 | +0.2 | +0.5 | +3.3 | +2.3 |
| Example 10 | 0.94 | 0.74 | 0.022 | +0.2 | +0.5 | +3.4 | +2.3 |
| Example 11 | 0.90 | 0.78 | 0.018 | +1.5 | +0.2 | +3.9 | +2.5 |
| Example 12 | 0.92 | 0.80 | 0.021 | +2.5 | +0.1 | +4.0 | +2.5 |
| Comparative Example 1 | 0.68 | — | 0.015 | 0 | 0 | 0 | 0 |
| Comparative Example 2 | 0.84 | 0.79 | 0.025 | −4.5 | −3.6 | +1.5 | −1.0 |
| Comparative Example 3 | 0.61 | 0.77 | 0.068 | −3.0 | −4.3 | −0.5 | −1.8 |
| Comparative Example 4 | 0.61 | 0.40 | 0.148 | −3.5 | −4.5 | −1.0 | −4.4 |

|  | Lower layer thickness (μm) | Upper layer thickness (μm) | Magnetic powder ||||
| --- | --- | --- | --- | --- | --- | --- |
|  |  |  | Lower layer Hc (Oe) | Upper layer Hc (Oe) | Hexagonal ferrite powder ||
|  |  |  |  |  | D (μm) | plate ratio |
| Example 1 | 3 | 0.3 | 520 | 950 | 0.05 | 3 |
| Example 2 | 3 | 0.7 | 520 | 950 | 0.05 | 3 |
| Example 3 | 3 | 1.0 | 520 | 950 | 0.05 | 3 |
| Example 4 | 3 | 0.3 | 520 | 950 | 0.05 | 3 |
| Example 5 | 3 | 0.4 | 480 | 1400 | 0.035 | 3.2 |
| Example 6 | 3 | 0.4 | 660 | 1400 | 0.035 | 3.2 |
| Example 7 | 3 | 0.4 | 700 | 1400 | 0.035 | 3.2 |
| Example 8 | 3 | 0.4 | 700 | 1200 | 0.04 | 3.5 |
| Example 9 | 3 | 0.4 | 700 | 1200 | 0.04 | 3.5 |
| Example 10 | 3 | 0.4 | 700 | 1200 | 0.04 | 3.5 |
| Example 11 | 3 | 0.4 | 700 | 1250 | 0.05 | 4.0 |
| Example 12 | 3 | 0.4 | 700 | 1300 | 0.05 | 4.5 |
| Comparative Example 1 | 3 | — | 950 | — | 0.05 | 3 |
| Comparative Example 2 | 3 | 0.4 | 520 | 780 | — | — |
| Comparative Example 3 | 3 | 0.3 | 520 | 980 | 0.06 | 4.8 |
| Comparative Example 4 | 3 | 0.3 | 520 | 950 | 0.05 | 3 |

As shown in Table 1, the magnetic recording medium for each example according to the invention has excellent surface characteristics and reproducibility in a wide frequency range from a low range to a high range.

The magnetic recording medium according to the invention can be easily produced by simultaneously coating several layers and making longitudinal orientation for each layer in order to make difference in each longitudinal orientation rate of each layer due to the configuration of each magnetic powder. As apparent from Table 1, the magnetic recording medium thus produced maintains the good surface characteristics between each surface and in the upper surface of the medium, and an excellent S/N ratio.

As described in detail, the magnetic recording medium according to the invention exhibits high reproducibility in a wide frequency range from a short wavelength region to a long wavelength region, and also excellent running durability and reliability.

Moreover, according to the method of the invention, such magnetic recording media as having the difference in the longitudinal orientation of each layer can be easily produced by simultaneously coating a plurality of layers and by making time longitudinal orientation in each layer. The magnetic recording media thus obtained exhibits good surface characteristics between each surface and in the upper surface of the media, and an excellent S/N ratio and durability.

Further, since the method according to the invention can be simultaneously applied to both of the magnetic recording medium of the invention and the conventional one, it is industrially useful.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A magnetic recording medium having a nonmagnetic supporting member and a plurality of magnetic layers formed on at least one major surface of the nonmagnetic supporting member, said plurality of magnetic layers comprising:

a first longitudinally oriented magnetic layer having a first longitudinal orientation rate located uppermost and comprising a binder and a hexagonal system ferromagnetic powder; and a second longitudinally oriented magnetic layer having a second longitudinal orientation rate located between the nonmagnetic supporting member and said first longitudinally oriented magnetic layer and comprising a binder and a needle-like crystal magnetic powder, wherein said first and second magnetic layers have simultaneously regulated longitudinal orientation rates, the first longitudinal orientation rate of the first longitudinal oriented magnetic layer is at least 0.5 and is smaller than the second longitudinal orientation rate of the second longitudinally oriented magnetic layer, the second longitudinal orientation rate being at least 0.68.

2. The magnetic recording medium according to claim 1, wherein said first longitudinal orientation rate is at least 0.55.

3. The magnetic recording medium according to claim 1, wherein said second longitudinal orientation rate is at least 0.7.

4. The magnetic recording medium according to claim 1, wherein said hexagonal system ferromagnetic powder has an average particle diameter of 0.03 to 0.1 micron.

5. The magnetic recording medium according to claim 1, wherein said hexagonal system ferromagnetic powder has a plate ratio of 2 to 7.

6. The magnetic recording medium according to claim 1, wherein said needle-like crystal magnetic powder is selected from the group consisting of $\gamma\text{-Fe}_2\text{O}_3$, $\text{Co-}\gamma\text{-Fe}_2\text{O}_3$, $\text{CrO}_2$ and metal ferromagnetic powder.

7. The magnetic recording medium according to claim 1, wherein said second longitudinally oriented magnetic layer has a thickness of 1 to 5 microns.

8. The magnetic recording medium according to claim 1, wherein said first longitudinally oriented magnetic layer has a thickness of 0.1 to 0.5 micron.

9. The magnetic recording medium according to claim 1, wherein said first longitudinally oriented magnetic layer contains a first antistatic agent, and said second longitudinally oriented magnetic layer contains a second antistatic agent and wherein said second antistatic agent is presented in an amount smaller than that of said first antistatic agent.

10. A method for producing a magnetic recording medium having a non-magnetic supporting member and a plurality of magnetic layers formed on at least one major surface of the nonmagnetic supporting member, said plurality of magnetic layers including an uppermost longitudinally oriented magnetic layer located uppermost and a lower longitudinally oriented magnetic layer located between the nonmagnetic supporting member and the uppermost longitudinally oriented magnetic layer, comprising the steps of:

providing a nonmagnetic supporting member;

coating on the base support, a lower magnetic coating having a needle-like crystal ferromagnetic powder dispersed in a first binder ingredient and an uppermost magnetic coating having hexagonal system ferromagnetic powder dispersed in a second binder ingredient;

simultaneously regulating the longitudinal orientation rates of said lower magnetic coating and said uppermost magnetic coating, the longitudinal orientation rate of said uppermost magnetic coating being at least 0.5 and being smaller than the longitudinal orientation rate of said lower magnetic coating, the longitudinal orientation rate of said lower magnetic coating being at least 0.68; and drying said uppermost magnetic coating and said lower magnetic coating to form the uppermost longitudinally oriented magnetic layer and a lower longitudinally oriented magnetic layer.

* * * * *